United States Patent [19]

Kambe et al.

[11] Patent Number: 4,687,624

[45] Date of Patent: Aug. 18, 1987

[54] LIQUID METAL COOLED FAST BREEDER REACTOR

[75] Inventors: Mitsuru Kambe, Mito; Shuichi Sasaki, Zama, both of Japan

[73] Assignee: Doryokuro Kakunenryo Kaihatsu Jigyodan, Tokyo, Japan

[21] Appl. No.: 638,613

[22] Filed: Aug. 7, 1984

[30] Foreign Application Priority Data

Aug. 16, 1983 [JP] Japan .................. 58-149376

[51] Int. Cl.$^4$ ........................... G21C 19/10
[52] U.S. Cl. ................... 376/264; 376/261; 376/271; 376/403; 376/460
[58] Field of Search .............. 376/171, 202, 206, 260, 376/261, 264, 268, 271, 290, 341, 402, 403, 404, 405, 406, 460, 463

[56] References Cited

U.S. PATENT DOCUMENTS 3,428,522  2/1969  Muller .................. 376/271
3,773,616  11/1973  Aubert .................. 376/460

FOREIGN PATENT DOCUMENTS 2373858  8/1978  France .................. 376/206

Primary Examiner—Deborah L. Kyle
Assistant Examiner—Richard L. Klein
Attorney, Agent, or Firm—Wenderoth, Lind & Ponack

[57] ABSTRACT

A liquid metal cooled fast breeder reactor which permits a closer installation of a fuel handling mechanism relative to an upper reactor core structure of the reactor. The fuel handling mechanism has a fuel handling body without a housing, and has a rotational driving device on a rotating plug of a shield plug device of a reactor vessel. The fuel handling mechanism has an aseismatic support extending outwardly from the upper reactor core structure. The fuel handling mechanism is supported, at its upper portion, by the rotational driving device, and secured, at its lower protion, by the aseismatic support.

6 Claims, 7 Drawing Figures

LIQUID METAL COOLED FAST BREEDER REACTOR

BACKGROUND OF THE INVENTION

The present invention relates in general to a liquid metal cooled fast breeder reactor equipped with an improved fuel handling mechanism, and more particularly to an improved liquid metal cooled fast breeder reactor which permits a closer installation of a fuel handling mechanism relative to an upper reactor core structure, thereby establishing compactness of the total structure of the reactor.

In the conventional liquid metal cooled fast breeder reactors, whether loop-type or tank-type reactors, there is equipped, as shown in FIG. 1, a fuel handling mechanism 30 which comprises generally a fuel handling body 6 and a cylindrical housing 31 surrounding the fuel handling body for aseismatic purposes. More specifically, the conventional fuel handling mechanism 30 including the cylindrical housing 31 is provided at its lower end with a gripper 13 which is vertically moved by a gripper lifting device, and supported by a rotational driving device 16 and suspended therefrom within the reactor vessel 1 so that it is accessible to a selected one of core assemblies 9 in the reactor core 8. Thus, aseismatic supporting effects are achieved by the cylindrical housing 31, which embraces the suspended fuel handling body 6. In the case of a liquid metal cooled fast breeder reactor on a scale of 1,000 MWe, the housing 31 of its fuel handling mechanism will have approximately 10 m in length, 1.5 m in diameter and 10 ton in weight. From a viewpoint of achieving smaller and lighter structure of the reactor, it is necessary to decrease a diameter of a rotating plug 4 of the reactor vessel which supports both the fuel handling mechanism 30 and an upper reactor core structure 5 of the reactor. However, it is limited to place the fuel handling mechanism 30 closely adjacent to the upper core structure 5 due to the cylindrical housing 31, and the provision of the cylindrical housing is a bottleneck for producing smaller and lighter structure of the reactor. Besides, the housing 31 generally has a wall-thickness of about several tens of milimeters, and therefore repeatedly receives a thermal stress due to rocking motion of the liquid surface 12 of the liquid metal coolant in the reactor vessel 1 and the changes of operating temperature, and so forth. In order to decrease the thermal stress, it is necessary to provide, for example, a thermal insulator 32 on the external surface of the housing 31 adjacent to the liquid surface 12. This also have caused an increase of the weight of the housing and a difficulty in providing the fuel handling mechanism 30 in proximity to the upper core structure 5. The elements or parts represented by the other numerals in FIG. 1 will be explained hereinbelow in the description referring to FIG. 2 wherein like parts are identified by the same reference numerals in FIG. 1.

SUMMARY OF THE INVENTION

An object of the present invention is to provide a new, smaller and lighter liquid metal cooled fast breeder reactor which permits a close installation of the fuel handling mechanism and the upper core structure to thereby decrease diameters of the rotating plug and the reactor vessel.

Another object of the present invention is to provide a new, liquid metal cooled fast breeder reactor which permits abolition of the housing of the conventional fuel handling mechanism and the thermal insulator provided thereon to thereby considerably decrease the total weight of the reactor structure.

The liquid metal cooled fast breeder reactor according to the present invention has a reactor vessel, a reactor core in the reactor vessel, and a shield plug device for sealing an upper opening of the reactor vessel. The shield plug device consists of a fixed plug, and at least one rotating plug eccentrically mounted on the inner side of the fixed plug. The reactor has further an upper core structure extending downwardly through the rotating plug toward the reactor core, and a fuel handling mechanism suspended vertically down into the reactor vessel through the rotating plug.

In order to attain the foregoing objects of the invention, the fuel handling mechanism according to the present invention comprises a fuel handling body without a housing, a rotational driving device placed on the rotating plug, and an aseismatic support extending outwardly from the upper core structure. The fuel handling body is supported, at its upper portion, by the rotational driving device, and secured, at its lower portion, by the aseismatic support.

Additional objects and features of the present invention will become apparent from the detailed description of preferred embodiments of the invention, which will be made with reference to the accompanying drawings.

DESCRIPTION OF THE PREFERRED EMBODIMENT

Figure 1:
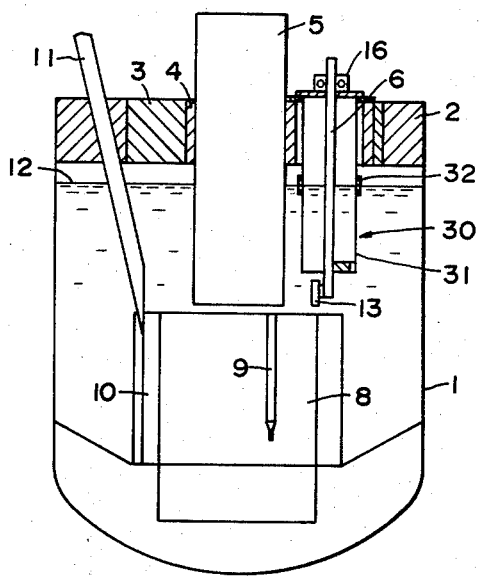
FIG. 1 is an explanatory schematic diagram of a conventional prior art liquid metal cooled fast breeder reactor.
Figure 2:
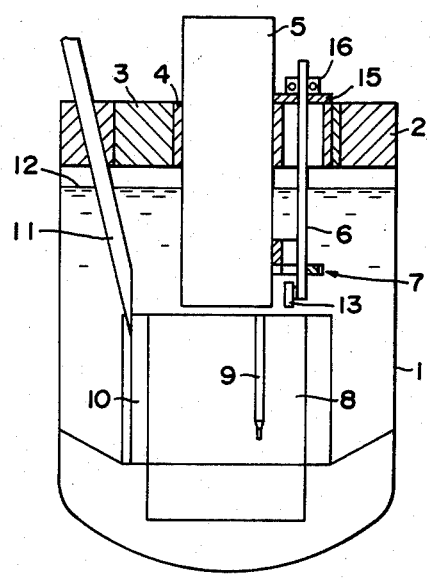
FIG. 2 is an explanatory schematic diagram of an embodiment of the liquid metal cooled fast breeder reactor according to the present invention.
Figure 3:
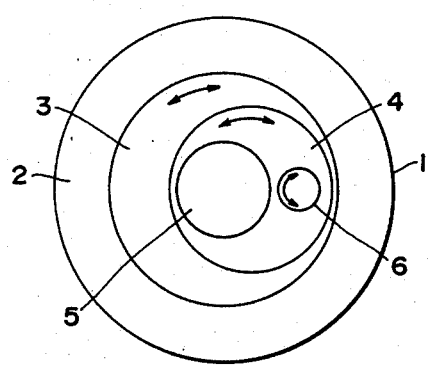
FIG. 3 is a plan view of the fast breeder reactor illustrated in FIG. 1.
Figure 4A:
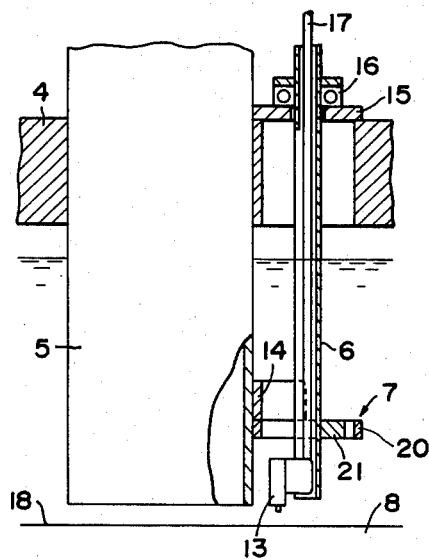
FIGS. 4A and 4B are explanatory schematic diagrams showing the structure of the fuel handling mechanism.
Figure 4B:
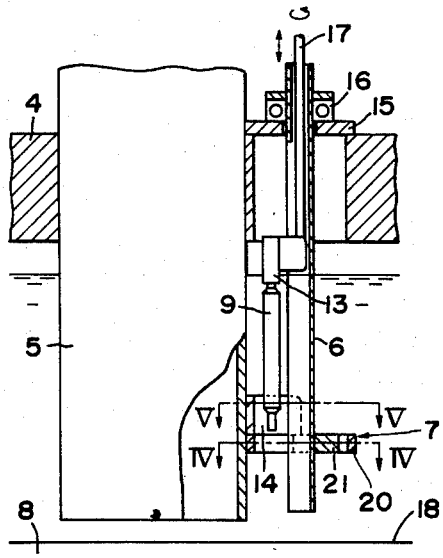

FIGS. 2 and 3 show a loop-type liquid metal cooled fast breeder reactor incorporating double rotating plugs, offset-arm type fuel handling mechanism and a ramp-type refueling system. The illustrated reactor is substantially similar to the conventional loop-type liquid metal cooled fast breeder reactor except for the structure of the fuel handling mechanism. A reactor core 8 composed of a plurality of core assemblies 9 is positioned at the center of the reactor vessel 1, and an upper core structure 5 is located above the reactor core 8. Within the reactor vessel 1 is filled liquid metal up to a liquid surface 12, and the vessel 1 is sealed by a shield plug device. The shield plug device consists of an outermost fixed plug 2, a large rotating plug 3 concentrically and inwardly positioned relative to the fixed plug 2 and a small rotating plug 4 eccentrically positioned relative to the large rotating plug 3. As illustrated in FIGS. 4A and 4B, the fuel handling mechanism according to the invention does not have a cylindrical housing, which is essential and indispensable to the conventional prior art technique, and comprises a fuel handling body 6 which is exposed and not surrounded by any housing. An upper portion of the fuel handling body 6 is rotatably secured to the small rotating plug 4 by means of a rotational driving device 16 and a flange 15 so that the body 6 is extended downwardly from a through-hole of the small rotating plug 4 into the reactor vessel 1. The lower end portion of the fuel handling body 6 is anchored by an aseismatic support 7 which is outwardly extended from the outer surface of the upper core structure 5. The rotational driving device 16 mounted on the small rotating plug 4 is constructed with a thrust bearing, an electric motor, etc. and rotationally drives the fuel handling body 6.

Figure 5:
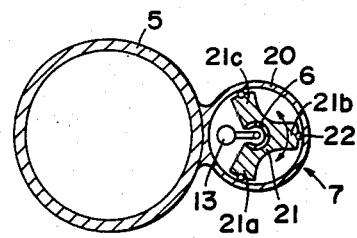
FIG. 5 is a sectional view taken along the line IV—IV in FIG. 4B.
Figure 6:
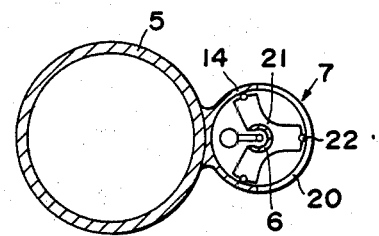
FIG. 6 is a sectional view taken along the line V—V in FIG. 4B.

As illustrated in FIGS. 5 and 6, the aseismatic support 7 has a securing ring 20 fixed to the outer surface of the upper core structure 5, a holder 21 fixed to the fuel handling body 6 and provided with three projections 21a, 21b, 21c outwardly extended in three radial directions, and three rolling elements 22 rotatably mounted to the respective ends of the projections of the holder 21. These rolling elements 22 are rotatably contacted with the inner surface of the securing ring 20, so that the holder 21 is smoothly rotatable clockwise and counterclockwise as shown with an arrow in FIG. 5 within the securing ring 20 by the aid of the lubricating effect of the liquid metal coolant. A fender 14 is preferably provided on the outer surface of the upper core structure 5 slightly higher than the position at which the securing ring 20 is fixed, so that it functions to prevent the core assemblies 9 during handling from colliding against the upper core structure. The fender 14 may be froemd integral with the securing ring 20 by extending upward the connecting part of the latter.

An operation of the improved fuel handling mechanism will be described. In order to take the core assemblies 9 in the reactor core 8 out of the reactor, a gripper 13 disposed within the fuel handling body 6 is moved to a desired position above the reactor core 8 by rotating the large rotating plug 3, the small rotating plug 4 and the fuel handling body 6, as illustrated in FIG. 4A. Then, the selected core assembly 9 is gripped by the gripper 13 and lifted upward, as illustrated in FIG. 4B. Thereafter, the large rotating plug 3, the small rotating plug 4 and the fuel handling body 6 are rotated to move the gripper 13 to the position right above a loading and unloading housing 10 disposed in the vessel 1, and the gripper is lowered to unload the core assembly. The unloaded fuel assembly is taken out of the reactor through a ramp 11. When the core assemblies are loaded into or unloaded from the core 8, the selected core assembly 9 is held by the gripper 13 and vertically lifted or lowered along the fuel handling body 6 by means of a gripper lifting device 17. At the time of the loading/unloading, it is necessary to lower the gripper 13 to the top 18 of the core assemblies and completely pull out the gripped core assembly from the core 8. In case of the liquid metal cooled fast breeder reactor on the scale of 1000 MWe, a stroke of vertical movement of the gripper needs approximately 5 m in length, and accordingly the fuel handling body 6 is required to have a length of about 10 m from its lower end to the upper surface of the shield plug device. The aseismatic support 7 can improve the positioning accuracy of the gripper 13 of such an elongated and thin fuel handling body 6, and prevent the fuel handling body 6 from being buckled at the time of earthquakes. Therefore, provision of the aseismatic support 7 can exclude a housing which has been essential to the conventional technique, and permits a closely adjacent installation of the fuel handling body 6 relative to the upper core structure. When an earthquake occurs during the loading/unloading of the core assembly, the aforementioned fender 14 and prevent the suspended core assembly from colliding with the upper core structure.

Although the present invention has been described with reference to the loop-type liquid metal cooled fast breeder reactor having the double rotating plugs, it will be readily contemplated by the skilled in the art that the present invention can be applied to fast breeder reactors having a single rotating plug or triple rotating plugs, and to a tank-type fast breeder reactor.

According to the present invention, a cylindrical housing which was essential to the conventional fuel handling mechanism is not necessary, and the weight can be decreased by approximately 10 ton. Besides, both the fuel handling mechanism and the upper core structure can be made closer to each other, and the rotating plug can be reduced in diameter by approximately 10%. Thus, the fixed plug and the reactor vessel can be made smaller in diameter, and weight of these members can be reduced considerably. In addition, the present invention does not require provision of a thermal insulator, which has been essential to maintain a reliable structure of the housing of the conventional fuel handling mechanism. Accordingly, the total weight of the reactor structure can be considerably decreased in the present invention.

What is claimed is:

1. A liquid metal cooled fast breeder reactor, including a reactor vessel, a reactor core within said reactor vessel, a shield plug device adapted to seal an upper opening of said reactor vessel, said shield plug device consisting of a fixed plug and at least a single rotating plug eccentrically rotatively mounted to said fixed plug, an upper core structure extending downwardly through said rotating plug toward said reactor core, and a fuel handling mechanism suspended vertically down into said reactor vessel through said rotating plug, said fuel handling mechanism comprising:

a fuel handling body, a rotational driving device, mounted on said rotating plug so as to reduce therewith, for rotationally driving said fuel handling body with respect to said rotating plug about a fuel handling body axis of rotation, said rotational driving device supporting an upper portion of said fuel handling body, and an aseismatic support fixed to and extending radially outwardly from said upper core structure, said aseismatic support securing a lower portion of said fuel handling body and including means for fixing said lower portion against radial and circumferential movement with respect to said upper core structure.

2. A liquid cooled fast breeder reactor according to claim 1, wherein said fuel handling body extends downward through said rotating plug into said reactor vessel and said fuel handling body axis of rotation is horizontally spaced from said upper core structure.

3. A liquid cooled fast breeder reactor according to claim 1 wherein said rotational driving device comprises means for supporting said fuel handling body above said rotating plug.

4. A liquid cooled fast breeder reactor according to claim 1, further comprising a gripper for gripping fuel rods at a position radially spaced from said fuel handling body axis of rotation, mounted to a lower end of said fuel handling body so as to extend radially outward from said fuel handling body axis of rotation and rotate with rotation of said fuel handling body by said rotational driving device.

5. A liquid metal cooled fast breeder reactor, including a reactor vessel, a reactor core within said reactor vessel, a shield plug device adapted to seal an upper opening of said reactor vessel, said shield plug device consisting of a fixed plug and at least a single rotating plug eccentrically rotatably mounted to said fixed plug, an upper core structure extending downwardly through said rotating plug toward said reactor core, and a fuel handling mechanism suspended vertically down into said reactor vessel through said rotating plug, said fuel handling mechanism comprising:

a fuel handling body, a rotational driving device, mounted on said rotating plug so as to rotate therewith, for rotationally driving said fuel handling body with respect to said rotating plug about a fuel handling body axis of rotation, said rotational driving device supporting an upper portion of said fuel handling body, and an aseismatic support extending radially outwardly from said upper core structure, said aseismatic support securing a lower portion of said fuel handling body and including a securing ring fixed to the outer surface of said upper core structure, a holder having a plurality of radially outwardly extended projections, said holder being fixed to said fuel handling body, and a plurality of rolling elements, each being rotatably held between said projections and said securing ring, for permitting said holder to move circumferentially within said securing ring.

6. The liquid metal cooled fast breeder reactor according to claim 5, wherein said aseismatic support is further provided with a fender, said fender being positioned on said upper core structure and at a position slightly above said securing ring.

* * * * *